United States Patent Office 3,101,250
Patented Aug. 20, 1963

3,101,250
PROCESS FOR SORPTION OF BROMIDE ION ON ANION EXCHANGE RESINS
Leland Clarence Schoenbeck, Wilmington, Del., assignor to E. I. du Pont de Nemours and Company, Wilmington, Del., a corporation of Delaware
No Drawing. Filed Nov. 10, 1961, Ser. No. 151,429
9 Claims. (Cl. 23—87)

This invention is directed to the recovery of bromine and more particularly to a new and novel method of sorption recovery of bromide ion, from aqueous solutions thereof, on anion exchange resins. According to the present invention, bromide ion is recovered by effecting its sorption on an anion exchange resin already containing chemisorbed bromine and chlorine as polybromochloride ions. An important embodiment of this invention is the recovery of bromine from sea water and other industrially important bromide-containing brines by acidifying the solution and oxidizing its bromide content with chlorine, preferably with excess chlorine, then contacting the acidified and chlorinated brine with a strong base anion exchange resin to sorb bromine as a resin-interhalogen complex of bromine and chlorine, followed by utilizing this form of the resin to treat a bromide-containing solution according to the method of this invention whereby bromide is removed from the solution and the resin loading with respect to the total bromine content is correspondingly increased. By total bromine is meant bromine regardless of its valence state.

Anion exchange resins in suitable form, such as the chloride, may be used to remove bromide ion from aqueous solution, by simple exchange of bromide for chloride ions (Shaw, U.S. 2,945,746). Such exchange, however, is not entirely satisfactory, particularly when the solution also contains chloride ion in large amounts.

It is also known (Aveston et al., Chemistry and Industry, September 1957) that anion exchange resins as the bromide or chloride sorb molecular bromine; and it has been further found that such resins chemisorb bromine-chloride (BrCl) as well. The bromine and the chlorine (in the case of BrCl) are apparently held on the resin as polybromohalide ions, which may be formulated as univalent complex anions such as dibromochloride ions ($Br_2Cl^-$) and bromodichloride ions ($BrCl_2^-$), in association with the resin's fixed cationic sites, e.g., quaternary ammonium ions.

It has now been discovered that the strong base anion exchange resins containing such sorbed bromine and chlorine are highly effective for further removing bromide ion from aqueous solutions.

Accordingly, it is an object of this invention to provide a novel process for the recovery of bromide ion from aqueous solutions thereof and for concentrating such bromine on anion exchange resins.

Another object is to provide an improved ion exchange process for separating bromide from chloride ion.

Still another object is to provide an integrated process wherein a strong base anion exchange resin capable of chemisorbing bromine is utilized to recover bromine such that the resulting resin contains both sorbed bromine and chlorine, followed by contacting the bromine- and chlorine-laden resin with an aqueous bromide and thereby increasing the total bromine loading of said resin and enabling the recovery of such bromine from the resin in a correspondingly more concentrated form.

These and other objects will become apparent in the following description and claims.

More specifically, the present invention is directed to a process for recovering bromide ion from aqueous solution by ion exchange which process comprises contacting the solution with an anion exchange material having fixed cationic sites and in association therewith polybromochloride ions, $BrXCl^-$ where X stands for Cl or Br or mixtures thereof, whereby one or more Cl groups of said polyhalide ions is replaced by Br.

In the practice of this invention, the use of resin containing polybromochloride ions wherein Cl predominates over Br, as in $BrCl_2^-$ versus $Br_2Cl^-$, is highly preferred by virtue of the higher capacity of such resin forms for bromide ion.

Broadly, the process of the present invention comprises mixing the resin polybromochloride with a bromide ion source solution, such as aqueous hydrobromic acid or aqueous NaBr brine, whereupon bromide is rapidly taken up by the resin. As the resin adsorbs bromine ion from the solution it becomes progressively darker in color, from yellow to red brown with increasing bromine content. In this manner, the bromine loading on the resin can be multiplied 1.5 to three times. The resin with its increased bromine content is separated from the bulk liquid phase and its bromine content can be recovered substantially completely by a variety of methods including extraction, steam distillation, chemical reaction to convert the bromine into recoverable inorganic bromides and/or organic bromo compounds. The bromine is conveniently recovered from the resin by reduction of the complexes to free bromide and removal as a concentrated aqueous phase.

No special equipment or conditions are needed to conduct this novel process, which process is adaptable to counter-current and cocurrent operations in conventional ion exchange equipment at ordinary temperatures and pressures. While the temperature of the bromide solution may vary widely say from its freezing to its boiling point, temperatures below about 80° C. are normally preferred.

Anion exchange resins suitable for preparing the resin-polybromochloride compounds as starting materials for use in the present process are strong base anion exchange resins of the quaternary ammonium type. They are essentially long chain-like and web-like water-insoluble polymeric molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art. Typical resins which may be utilized are based on the polystyrene backbone; divinylbenzene cross-linking units provide the necessary degree of dimensional stability and water-insolubility to the polymer, while groups of the formula

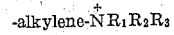

-alkylene-$\overset{+}{N}R_1R_2R_3$ provide the positively charged sites. $R_1$, $R_2$ and $R_3$ are usually alkyl such as methyl, ethyl and the like, but may be alkylol such as hydroxy-ethyl, and may be joined to constitute along with the nitrogen atom a heterocyclic radical such as methyl-piperidinium or pyridinium. Resins such as these may be prepared by chloromethylating a polystyrene-divinylbenzene copolymer, then reacting with the appropriate tertiary amine.

Specific resins that can be employed in the practice of the present invention are described in U.S. Patent 2,591,573. Other quaternary ammonium type resins that may be used are disclosed by U.S. Patents 2,630,427, 2,597,494 and U.S. Patent 2,597,4440. A representative example is the strong base anion exchange resin prepared according to the Examples (A-B-C) of U.S. Patent 2,591,573. The resin hydroxide is converted to the chloride by flowing NaCl brine, e.g., sea water through it. It is understood that commercial Amberlite IRA 400 listed in the following table is of the class of strong base anion exchange resins described in said U.S. Patent 2,591,573. The resins described in U.S. Patent 2,900,352 can also be used; for example, the resin prepared according to Example 5 of this patent. Also, the resins described broadly and as specifically shown in Example 2 in U.S. Patent 2,614,099 may be used in this process.

Suitable commercial resins follow. Type I resins are understood to have $$-C_6H_4-CH_2-\overset{+}{N}(CH_3)_3$$

groups, type II resins to contain $$-C_6H_4-CH_2-\overset{+}{N}(CH_3)_2CH_2CH_2OH$$

groups, and the pyridine type to be based on pyridine as the source of the cationic sites.

STRONG BASE ANION EXCHANGE RESINS

| Commercial name | Source | Quaternary ammonium type |
|---|---|---|
| Duolite A-101 | Chemical Process Co. of Redwood City, California. | I. |
| Duolite A-101 (HP) | | I. |
| Duolite A-101 D | | I. |
| Retardion 11A8 | | I. |
| Dowex 2 | Dow Chemical Co. of Midland, Michigan. | II. |
| Dowex 21K | | I. |
| Dowex 1 | | I. |
| Dowex 11 | | I. |
| Amberlite IRA 400 | Rohm and Haas Co. of Phila., Pa. | I. |
| Amberlite IRA 401 | | I. |
| Amberlite IRA 402 | | I. |
| Amberlite IRA 410 | | II. |
| Amberlite IRA 411 | | II. |
| Permutit S-1 | The Permutit Co. of New York, New York. | I. |
| Permutit SK | | Pyridine. |

These resins are normally obtained as granules or uniform beads, usually in the hydroxide or chloride form and in particle sizes of from about 16 to 400 mesh. The chloride form is preferred. However, other forms of the resin may be employed, so long as the anionic component is exchangeable by chloride and bromide ions, e.g., the hydroxide, acetate, nitrate, bisulfate and sulfate, phosphate, fluoride and the like forms.

Treating any of the heretofore described resins with bromine or brominechloride in sodium chloride brine, for example, results in the anions of the resin being displaced by a bromine-containing polyhalide ion. Mixtures of resins may be used in practicing the present invention.

Normally the strong base anion exchange resins, as prepared by the known methods and obtained commercially, are in part reactive towards free bromine and chlorine, and at first irreversibly consume some of this halogen in undergoing substitution or addition reactions. To obtain consistent adsorption results it is beneficial but not necessary to condition the resin by pretreatment with bromine or chlorine or both, in effect to "burn away" (or halogenate) labile (or reactive) sites and produce a resin providing consistently high yields of recoverable bromine by the adsorption process. Conveniently the resin, say the commercial product in suitable, e.g., chloride form, is subjected to a reaction cycle of being contacted with a bromine and/or chlorine solution, e.g., acidified and chlorinated sea water to absorb oxidant halogen, then treated with a reducing agent, e.g., $SO_2$ in the presence of water to reduce the halogen, then washed with brine to regenerate the chloride form. The cycle is repeated until satisfactorily reproducible halogen adsorption is obtained. Occasional washing with an organic solvent, e.g., acetone, helps keep the resin clean of water-insoluble but solvent-soluble organic matter that may contribute to clogging of the resin pores.

For use in the practice of this invention, a strong base anion exchange resin is converted into interhalogen form wherein the halogens are bromine and chlorine constituting polybromochloride ions such as dibromochloride, $Br_2Cl^-$, and bromodichloride, $BrCl_2^-$, ions. Broadly resin chloride or bromide is treated with bromine, chlorine or brominechloride to produce a resin-interhalogen compound. This process may be formulated in its simplest aspect as given in Equation 1, (1) $\qquad R^+X^- + XY = R^+X_2Y^-$ where X and Y stand for Cl and Br and at least one of the occurrences is different, and may be conducted according to any of the techniques of the art such as described by Aveston et al., Chemistry and Industry, September 1957, and Ziegler, Angew. Chemie 71, 283 (1959). Preferably commercial resin chloride is contacted with bromine in the presence of chlorine as illustrated in the accompanying examples. A ready source of bromine is sea water (about 65 p.p.m. Br-) which can be put in proper interhalogen form for adsorption on the resin by acidifying and adding at least one equivalent of chlorine, as in Equation 2, (2) $\qquad 2Br^- + Cl_2 = Br_2 + 2Cl^-$ preferably 1.5 to 3 equivalents and more particularly 2 equivalents to convert bromine to brominechloride, as in Equation 3, (3) $\qquad Br_2 + Cl_2 = 2BrCl$ In view of the known interactions of molecular halogens with halide ions, it is believed bromine and brominechloride associate with chloride ion (whether of the sea water or of the resin itself), forming polybromochloride ions such as dibromochloride ($Br_2Cl^-$) and bromodichloride ($BrCl_2^-$) which are held in the resin. The proportions of these complex ions will vary depending on the amounts of $Br_2$ and $Cl_2$ involved as indicated in Equations 2 and 3. In the preferred resin-interhalogen starting materials bromine chloride-based sites ($BrCl_2^-$) predominate over those based on $Br_2(Br_2Cl^-)$. It should be understood that $BrCl_2^-$ and $Br_2Cl^-$ are average structures; for example, $Br_2Cl^-$ ions may be visualized as a composite of $Br^-_3$ and $BrCl_2^-$.

While the utility of the resin polybromochlorides is not limited by any explanation or theory, it appears that the chloro groups of the polybromochloride ions are exchanged for bromide ions, per Equations 4 and 5, (4) $\qquad Br_2Cl^- + Br^- = Br_3^- + Cl^-$ (5) $\qquad BrCl_2^- + 2Br^- = Br_3^- + 2Cl^-$ Process 5 is the preferred process of this invention.

The bromide source may vary widely. It may be a natural or synthetic brine. Natural brines contain bromine as bromide ranging from 50 to 1000 p.p.m., but may have as high as 6000–7000 p.p.m.; their chloride contents are normally high with the ratio of chloride to bromide ranging broadly from about 20:1 to 500:1, usually at least 100:1. Thus the present invention provides a novel method for separating bromide from chloride ion. For purposes of this invention bromide will be adsorbed from such brines under neutral or acidic conditions; preferably the brine is adjusted to pH 5 or less. Bromide can also be recovered from aqueous hydrobromic acid or mixtures of hydrobromic with other acids such as hydrochloric or sulfuric acids. Also since the resins are normally water-wet, the present process is adaptable to adsorbing hydrogen bromide from the vapor state. Thus, the invention provides a method for removing hydrobromic from hydrochloric acid from vapor or aqueous phase.

As stated heretofore, an important embodiment of this invention comprises treating dilute bromide-containing brines to obtain the bromine in a more concentrated form. For example, bromide of sea water is converted to bromine and/or brominechloride which is adsorbed on an anion exchange resin above-described as interhalogen compounds. The absorbed halogen is reduced, e.g., with sulfur dioxide, Equation 6, to form free bromide ion which is eluted from the resin as an aqueous solution now more concentrated with respect to bromine than the original sea water.

(6) $\quad X_2 + SO_2 + 2H_2O \rightarrow 2HX + H_2SO_4$ where $X = Cl$ or $Br$.

The recovered bromide solution may be further concentrated by the present method by contacting it with another batch of the resin-interhalogen compound, thereby increasing the bromine loading, then reducing with aqueous sulfur dioxide and recovering the resulting solution as before. The cycle may be repeated as desired. From the resulting concentrated bromide solutions, molecular bromine can be economically recovered by oxidation with chlorine and air-blowing or steaming in the conventional way.

The reduction of halogen of the interhalogen compounds to halide ions can be effected to generate bromide ion in situ for readsorption on interhalogen resin sites. For example, a reducing solution of say $SO_2$ in aqueous NaCl, hydrochloric acid, or sea water is allowed to flow down through a column of resin-interhalogen compound obtained by adsorbing BrCl on resin chloride and having a characteristic reddish yellow color. The reducing solution decolorizes the resin on contact. The liberated bromide ion (colorless) enters the water phase and is displaced downward as a moving front in advance of fresh reducing solution. As the bromide-containing front of the effluent moves down the column it contacts interhalogen-rich resin which adsorbs the bromide (provided the moving front is substantially free of excess reducing agent) and takes on the characteristic darker, e.g. orange to red-brown color of bromine-richer resin. The resulting effluent remains practically bromide-free until substantially all the interhalogen sites, e.g., $Br_2Cl^-$ and $BrCl_2^-$, are converted to polybromide sites, e.g., $Br_3^-$. The conversion and concomitant concentration of the bromine on a smaller quantity of resin can be followed, for example, by observing the movement of the bromine down the column as a bromine-rich colored band. Flow of reducing solution can be stopped when the desired degree of concentration of bromine on the resin has been achieved. The bromine-poor and bromine-rich sections of the column can be separated mechanically. If desired, flow of the reducing solution can be continued to reduce the resin interhalogen compounds completely. In this case, the effluent is discarded until bromide ion appears in significant amounts and is then collected until the bromine-rich band is completely displaced from the column.

Representative examples illustrating the present invention follow.

The invention is illustrated below in the following examples with a commercially available resin, Dowex 1X8, a medium porosity resin consisting of 50 to 100 mesh beads and which is understood to contain trimethylbenzylammonium groups as the cationic sites, have a moisture content of 43% and a total exchange capacity (Cl⁻ form) of 1.33 meq./ml. of wet resin. This as well as other suitable strong base anion exchangers are described more fully in Dowex: Ion Exchange, 1958, The Dow Chemical Co., Midland, Michigan, on pages 4, 5, 71 and 73.

The resin, as resin chloride is in one or more cycles preconditioned as exemplified by adding it to 4 resin bed volumes of sea water to which has been added hydrochloric acid (to give pH 4.5), 4 grams/liter chlorine ($Cl_2$) and 8 grams/liter bromine ($Br_2$). After 16 hours the resin is filtered, transferred to a column, wetted with an equal volume of water and treated with a stream of sulfur dioxide gas until it is decolorized. The resin is washed with 16 volumes of saturated NaCl brine, then with 4 volumes water to yield purified resin chloride.

*Example 1*

A. Above-preconditioned resin chloride is converted into a bromine-chlorine interhalogen complex as follows: 8 liters of sea water (65 p.p.m. Br) is acidified to pH 4.3 with hydrochloric acid. 5 grams (0.07 mole) chlorine gas and 11 grams (0.07 mole) of liquid bromine are then dissolved in the solution. The resin (200 ml.) is added, stirred with the solution at room temperature for 4 hours, and recovered by filtration. Thus treated the resin contains oxidant halogen equivalent to 76.5 mg./ml. of bromine chloride (i.e., 55.5 mg./ml. of $Br_2$ and 21.0 mg./ml. of $Cl_2$).

B. The following tests show the remarkable ability of the resin-interhalogen compound to adsorb bromide ion. A solution containing 10.3 mg./ml. of bromide ion, prepared by mixing 125 ml. of 37% hydrochloric acid, 42 ml. of 96% sulfuric acid, 13 ml. of 48% hydrobromic acid and sea water to make one liter of stock solution, was treated in the following manner: 10 ml. of resin product from A was stirred in 25, 50 and 450 ml. portions of the stock solution at room temperature for 1 hour, filtered, washed with 100 ml. distilled water and analyzed for elutable bromine, with the following results.

| Test | Volume of bromide solution treated | Total elutable bromine on the resin, mg./ml. | | |
|---|---|---|---|---|
| | | Initial | Final | Amt. adsorbed |
| 1 | 25 | 55.5 | 79.6 | 24.1 |
| 2 | 50 | 55.5 | 108.0 | 52.5 |
| 3 | 450 | 55.5 | 163.2 | 107.7 |

Substantially identical results are obtained on employing the resin-interhalogen compound as a fixed bed and flowing the bromide solution through it.

In tests 1 and 2 the bromide was almost completely removed from the solution by the resin. In test 3 uptake of bromide ceased apparently when the resin became saturated with respect to the bromide ion of the solution, but the total bromine loading is about triple the original.

Test 2 shows that the resin picked up about an equal amount of bromine to about double the loading. At this stage it appears that the bromine-containing resin sites have the average constitution $R^+Br_2Cl^-$ as a result of the process $R^+BrCl_2^- + Br^- = R^+Br_2Cl^- + Cl^-$. The results of test 3 indicate that the $R^+Br_2Cl^-$ product of test 2, having a replaceable Cl group is still capable of adsorbing bromide.

The overall process may be represented as $$R^+BrCl_2^- + 2Br^- = R^+Br_3^- + 2Cl^-$$

The adsorption of bromide ion by the resin-interhalogen complexes (leading to a tripling of the loading under the above conditions) is particularly significant in view of the presence in the solution of competing sulfate and chloride ions which also have high affinity for the resin sites. In comparison the resin chloride itself under essentially the same conditions adsorbs a maximum of about 26 mg./ml. of bromide ion.

*Example 2*

1.6 ml. (5.1 grams) of elemental bromine was dissolved in 4 liters of pH 3.5 sea water. 100 ml. of above preconditioned resin chloride was added and the mixture stirred for 2 hours at room temperature and separated by filtration. The recovered resin contained 33.4 mg./ml. of adsorbed bromine which is considered to be held mainly as dibromochloride ion, $Br_2Cl^-$, with a minor proportion of bromodichloride ion, $BrCl_2^-$.

10 ml. portions of this bromine-laden resin were placed in each of three 11 mm. (inside diameter) tubes where the resin columns were supported by glass wool plugs. Through these columns were passed 25, 50 and 450 ml. portions of acid bromide solutions prepared as in Example 1 at flow rates listed below. Each column was then washed with 100 ml. distilled water and the resins analyzed for elutable bromine. The results follow:

| Initial Br on resin, mg./ml. | Volume of bromide solution passed through resin and flow rate | | Final Br on resin, mg./ml. |
|---|---|---|---|
| | Ml. | Cc./min./cm.$^2$ | |
| 33.4 | 25 | 2.4 | 58.0 |
| 33.4 | 50 | 4.7 | 59.1 |
| 33.4 | 450 | 6.4 | 60.2 |

The results show that the capacity of the resin for additional bromine as bromide ion is 24.6 to 26.8 mg./ml., that this capacity is substantially filled by the first 25 ml. of solution which contained 258 mg. of bromine (25.8 mg./ml. of resin) as bromide ion. The final bromine loading is 1.82 times the original. The exchange, $R^+Br_2Cl^- + Br^- = R^+Br_3^-$, would lead to a final loading of 1.5 times the original. Comparison with Example 1 shows that resin containing mainly $BrCl_2^-$ ions gives superior results.

*Example 3*

4.4 grams of chlorine ($Cl_2$) was dissolved in 8 liters of pH 4.3 sea water followed by 10 grams of bromine. 218 ml. of preconditioned resin was stirred with this bromine-chloride source solution for 2 hours at room temperature, recovered by filtration and found to contain 38.6 mg./ml. of elutable bromine as brominechloride (that is, in addition to bromine it contained an equivalent amount of oxidant chlorine). When 20 ml. of this resin was mixed with 4 liters of sea water which had been acidified to pH 3.5 with hydrochloric acid, the bromide content of the sea water decreased by 20%. In contrast the chloride form of the resin adsorbed essentially no bromide from the sea water under these conditions where the initial bromide level is low (60 p.p.m. Br as bromide) and the ratio of chloride to bromide is high (300 to 1).

*Example 4*

Dowex 1X8 strong base anion exchange resin in the chloride form, preconditioned as heretofore described, was treated with bromine chloride (BrCl) by contacting 19 ml. of the resin with 4 liters of acidified (pH 4.1) seawater to which had been added twice the amount of chlorine ($Cl_2$) stoichiometrically required to oxidize bromide ion (about 60 p.p.m.) to bromine according to the equation $2Br^- + Cl_2 = Br_2 + 2Cl^-$. After 40 minutes the resin was separated from the solution by filtration and was added to another 4 liter batch of seawater that had been acidified to pH 4.5 with sulfuric acid and partially chlorinated with 0.8 the amount of chlorine required by the stoichiometry of the above equation. The change in the bromine content of the acidified and partially chlorinated seawater is tabulated below.

REMOVAL OF BROMIDE FROM SEAWATER

| 1 | 2 | 3 | 4 |
|---|---|---|---|
| Time, minutes | Total halogen calcd. as $Br^2$, mg./l. | Total bromine, mg./l. | Bromide ion, mg./l. |
| 0 | 42.8 | 56.5 | 18.2 |
| 11 | 37.2 | 45.6 | 12.6 |
| 35 | 29.3 | 38.0 | 11.1 |

Column 1 shows the contact time. Column 2 gives the total oxidant halogen present in the solution calculated as bromine ($Br_2$). In column 3 total bromine is the bromine content irrespective of valence i.e. whether the bromine is oxidant bromine ($Br_2$) or bromide ion. Column 4 shows the bromide ion content of the solution. Initially it is 18.2 mg./l. of solution but after 35 minutes of contact with the resin-BrCl interhalogen compound the bromide ion content has decreased about 39%. Thus it is clear that under the above conditions the resin removes not only oxidant bromine but bromide ion as well.

It has been observed that naturally occurring brines, such as seawater, contain iodide ion in small amounts. In the novel process of the present invention, such iodide ions may be recovered along with bromide ion. The oxidation of acidified seawater with chlorine liberates iodine ($I_2$) as well as bromine ($Br_2$); both of these halogens are chemisorbed by the ion exchange resin in halide form. Also, in the particular method of this invention, the resin interhalogen compound of the form $R^+BrX_2^-$, where X is Br or Cl as herein defined, removes iodide as well as bromide ion from aqueous solution; both halide ion types are recovered from the resin as aqueous solution by reducing with sulfur dioxide as heretofore discussed.

It is understood that the preceding examples are representative and that they may be varied, within the scope of the total specification disclosure, as practiced by one skilled in the art, to achieve essentially the same results.

As many apparently widely different embodiments of this invention may be made without department from the spirit and scope thereof, it is to be understood that this invention is not limited to the specific embodiments thereof except as defined in the appended claims.

The embodiments of the invention in which an exclusive property or privilege is claimed are defined as follows:

1. A process for the sorption of bromide ion from an aqueous solution thereof, said aqueous solution being selected from the group consisting of aqueous hydrobromic acid, neutral and acid aqueous bromide-containing brine, by ion exchange, in which process said solution is contacted with an anion exchange material having fixed cationic sites and, in association therewith, polybromochloride ions of the formula $BrXCl^-$ in which polybromochloride ion X is selected from the group consisting of Cl, Br and mixtures thereof, at least one of said Cl groups of said polybromochloride ions being replaced by Br.

2. A process according to claim 1 wherein said X is Cl.

3. A process according to claim 1 wherein said bromide ion is recovered from bromide-containing brines.

4. A process according to claim 3 wherein said brine contains 50 to 7,000 p.p.m. bromide.

5. A process according to claim 3 wherein said brine has a Cl/Br ratio of from 20:1 to 500:1.

6. A process according to claim 1 wherein said aqueous solution is seawater.

7. A process according to claim 1 wherein said aqueous solution is aqueous hydrobromic acid.

8. A process according to claim 1 wherein said anion exchange material is an anion exchange resin of the strong base type.

9. A process according to claim 8 wherein said resin has fixed quaternary ammonium cationic sites.

References Cited in the file of this patent

UNITED STATES PATENTS 2,945,746    Shaw                July 19, 1960